(12) United States Patent
Markham

(10) Patent No.: US 7,815,222 B2
(45) Date of Patent: Oct. 19, 2010

(54) FLUID STORAGE TANK TRAILER

(76) Inventor: Gary R. Markham, 273 Country Lane Dr., Lumberton, TX (US) 77657

( * ) Notice: Subject to any disclaimer, the term of this patent is extended or adjusted under 35 U.S.C. 154(b) by 204 days.

(21) Appl. No.: 12/114,758

(22) Filed: May 3, 2008

(65) Prior Publication Data
US 2009/0273174 A1 Nov. 5, 2009

(51) Int. Cl.
*B60P 3/22* (2006.01)
(52) U.S. Cl. .................. 280/837; 280/838; 280/839
(58) Field of Classification Search .......... 280/837, 280/838, 839
See application file for complete search history.

(56) References Cited

U.S. PATENT DOCUMENTS

| | | | | |
|---|---|---|---|---|
| 4,406,471 A | * | 9/1983 | Holloway | 280/837 |
| 5,213,367 A | * | 5/1993 | Norman et al. | 280/837 |
| 5,538,286 A | * | 7/1996 | Hoff | 280/837 |
| 6,152,492 A | * | 11/2000 | Markham et al. | 280/837 |
| 6,199,910 B1 | * | 3/2001 | Wade | 280/837 |
| 6,279,955 B1 | * | 8/2001 | Fisher | 280/837 |
| 6,375,222 B1 | * | 4/2002 | Wade | 280/837 |
| 6,390,325 B1 | * | 5/2002 | Gonzales | 220/567.2 |
| 7,300,073 B2 | * | 11/2007 | Bachman | 280/839 |
| 7,387,316 B2 | * | 6/2008 | Keiser | 280/839 |

* cited by examiner

*Primary Examiner*—Lesley Morris
*Assistant Examiner*—Marlon A Arce

(57) ABSTRACT

Embodiments provide a fluid storage tank trailer including a base including a set of rear wheels, a tank supported by the base, the base including a set of skids adapted to engage the ground forward of the rear wheels when the trailer is not connected to a tow vehicle, the skids being adapted to support the tank bottom in relation to the ground, a forward frame extending from generally beneath the tank to the front end, the forward frame including a nose bar at the front end, the forward frame being adapted to be towed by a tow vehicle, a forward platform elevated above the forward frame, a first forward access ladder extending from the forward platform to the first side, and a second forward access ladder extending from the forward platform to the second side.

12 Claims, 4 Drawing Sheets

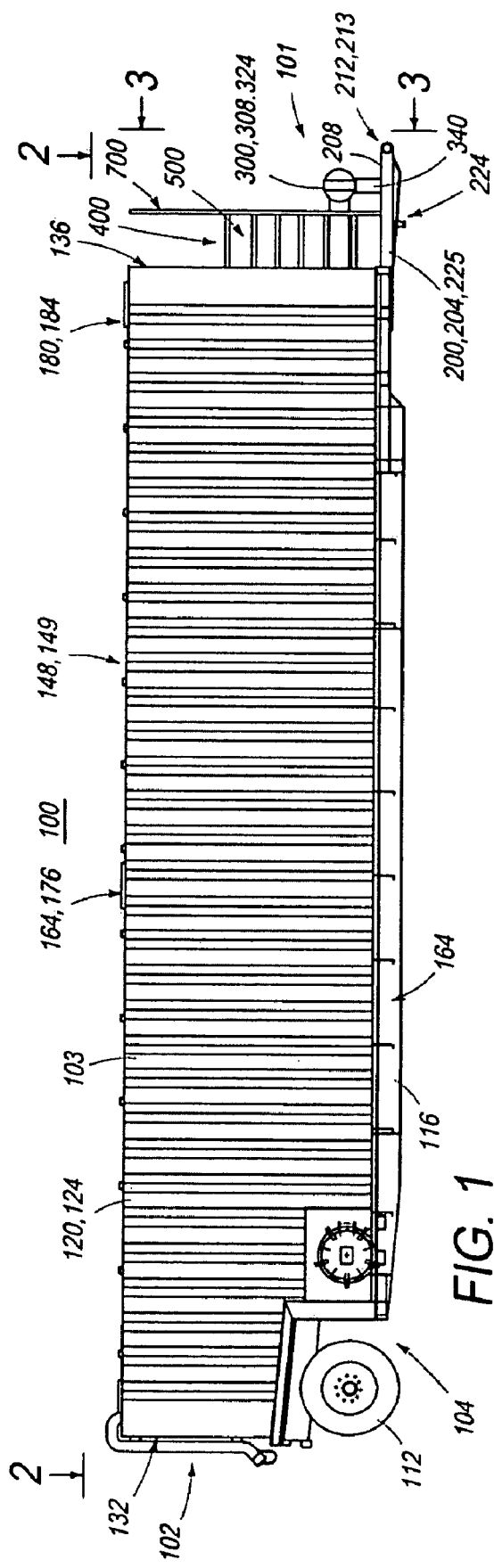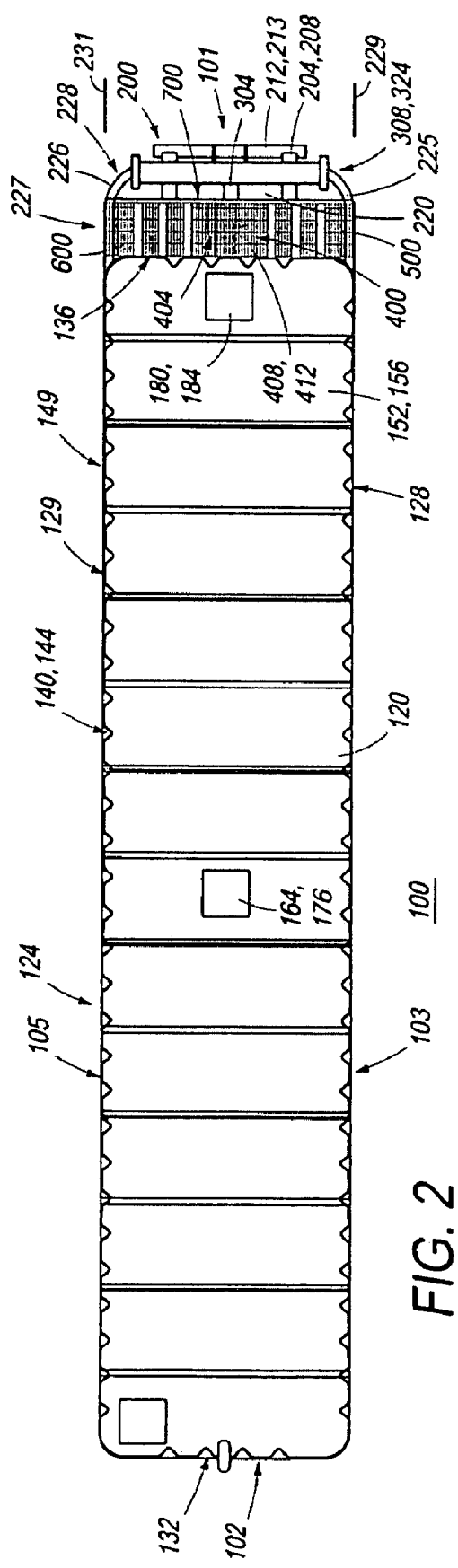

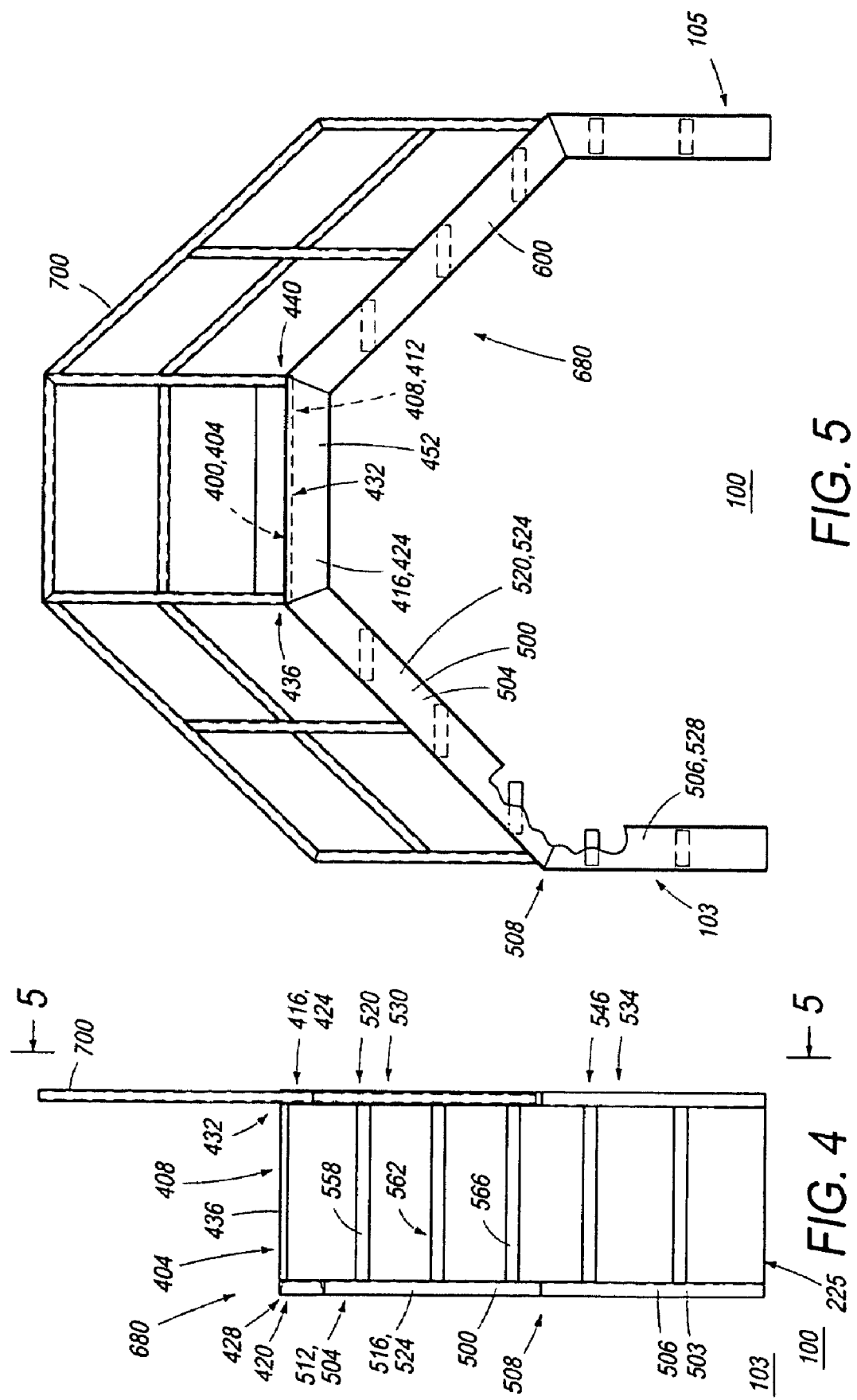

FLUID STORAGE TANK TRAILER

FIELD OF INVENTION

The disclosure relates to fluid storage tank trailers.

BACKGROUND OF INVENTION

Fluid storage tank trailers are used to provide storage for industrial fluids at temporary locations such as, for example, drilling sites for oil and gas wells. An empty fluid storage tank trailer is towed to a temporary location, such as a drilling site, by a tow vehicle such as a semi-tractor. At a drilling site, the fluid storage tank trailer is unhooked from the tow vehicle to rest in a fixed position on the ground or another suitable support surface, such as a layer of rock aggregate.

When resting in a fixed position on the ground, a fluid storage tank trailer is filled with fluid to be stored and dispensed. Examples of industrial fluids stored in fluid storage tank trailers include drilling mud, fracturing liquids, fluids from environmental cleanup, water, brine, and any other suitable fluid material. As used herein, the term "fluid" is intended to generally include any material which can flow into and out of a fluid storage tank trailer if maintained in a desired condition, and thus "fluid" is intended to include any flowing mixture, suspension, slurry, or combination of materials in different phases. One specific example of a use for a fluid storage tank trailer is storage of drilling mud at a drilling site for an oil and gas well.

Depending on project size, the number of fluid storage tank trailers in use at a drilling site can vary from about two to fifty or more. When numerous fluid storage tank trailers are present at a site, it can be convenient to position them adjacent each other, side by side, in rows. In each row, heading the side by side fluid storage tank trailers in one direction can simplify connecting fluid supply hoses to manifolds on the fluid storage tank trailers.

It will be understood by those skilled in the art that fluid storage tank trailers can be used in a variety of circumstances and locations, and for purposes different from those specifically described herein. For the reasons stated above, and for other reasons stated below which will become apparent to those skilled in the art upon reading and understanding the present specification, there is a need in the art for improved fluid storage tank trailers.

BRIEF DESCRIPTION OF INVENTION

The disclosure provides improved fluid storage tank trailers. Various shortcomings, disadvantages and problems of fluid storage tank trailers are addressed herein, which will be understood by reading and studying the following specification.

BRIEF DESCRIPTION OF DRAWINGS

FIG. 1 is a side elevation view of a fluid storage tank trailer according to an embodiment.

FIG. 2 is a top plan view of the fluid storage tank trailer taken generally along 2-2 in FIG. 1.

FIG. 4 is an enlarged partial side isolation view of a forward platform 400, first forward access ladder 500 and handrails 700 and taken generally along 4-4 in FIG. 3.

FIG. 5 is an enlarged partial isolation taken generally along 5-5 in FIG. 4.

DETAILED DESCRIPTION OF EMBODIMENTS

Figure 3:
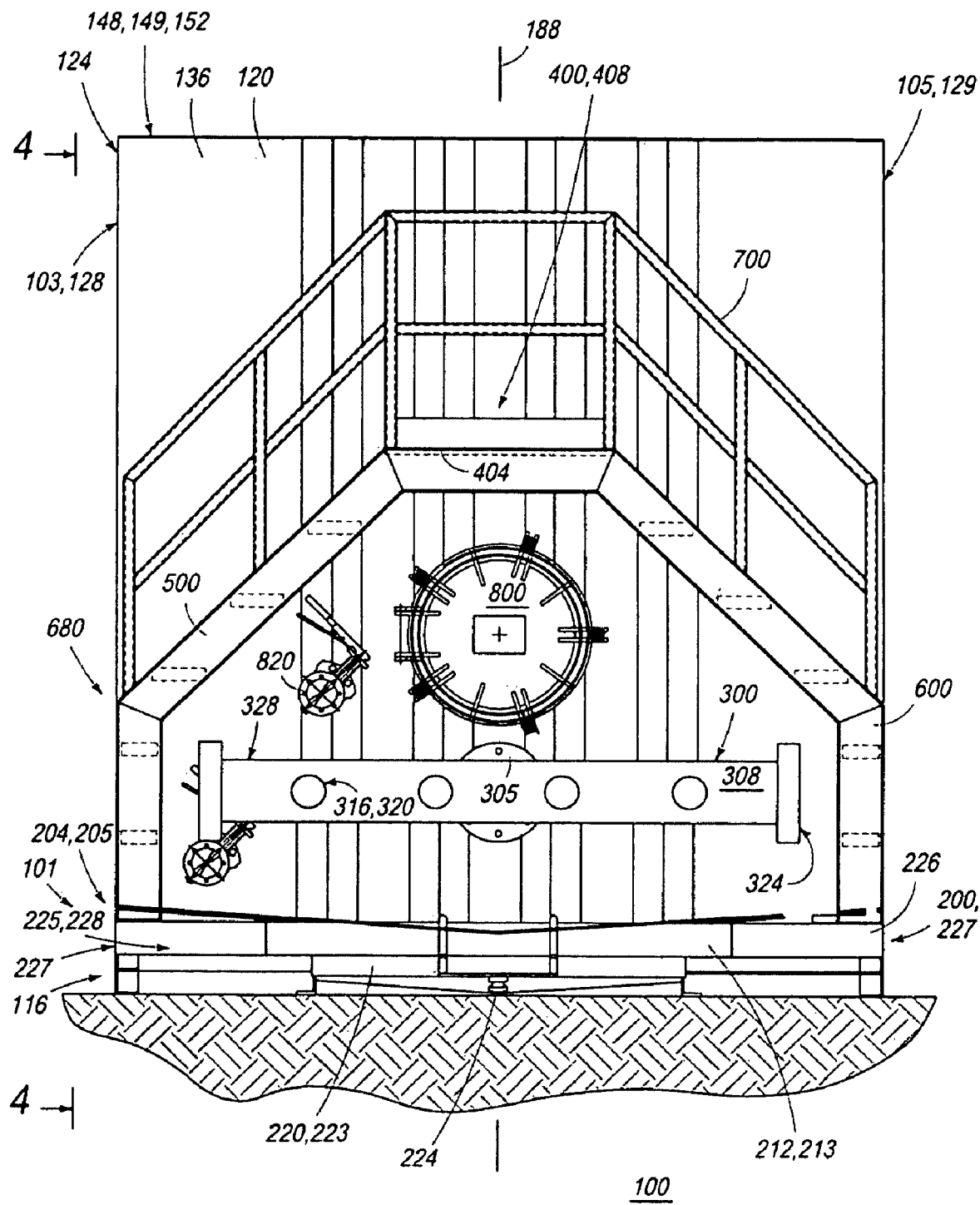
FIG. 3 is an enlarged end view of the fluid storage tank trailer taken generally along 3-3 in FIG. 1, clarified by omission of minor details including certain tank wall corrugations and manifold braces.

In the following detailed description, reference is made to the accompanying drawings that form a part hereof, and in which is shown by way of illustration specific embodiments which can be practiced. The embodiments are described in sufficient detail to enable those skilled in the art to practice the embodiments. It is to be understood that other embodiments can be utilized and that logical, mechanical and other changes can be made without departing from the scope of the embodiments. The following detailed description is, therefore, not to be taken in a limiting sense.

FIG. 1 is an elevated front perspective view of a fluid storage tank trailer 100 (hereinafter "trailer 100") according to an embodiment. One skilled in the art will appreciate that trailer 100 can be configured differently without departing from the scope of the present disclosure and embodiments. Trailer 100 is adapted to store and dispense fluid (not shown). As previously described herein, the term "fluid" is intended to generally include any material which can flow into and out of a fluid storage tank trailer if maintained in a desired condition, and thus "fluid" is intended to include any flowing mixture, suspension, slurry, or combination of materials in different phases. In the specific embodiment illustrated in FIG. 1, trailer 100 can be used to store and dispense fluids including, for example, drilling mud. Trailer 100 is generally described as having a rear end 102, a front end 101 opposite the rear end 102 in a forward direction, an elongated first side 103 extending between the front end 101 and rear end 102, and a second side 105 (shown in FIG. 2) opposite the first side 103 in parallel relation thereto.

Trailer 100 includes base 104 (FIG. 1). Base 104 is adapted to engage the ground. Base 104 includes a set of rear wheels 112 mounted on a rear axle (not shown) to engage the ground for rolling movement relative thereto. Rear wheels 112 support trailer 100 for towing by a suitable tow vehicle, such as a truck (not shown). Base 104 includes a set of skids 116. Skids 116 are spaced from rear wheels 112 and extend in a longitudinal direction. Skids 116 are adapted to engage the ground when trailer 100 is not connected to a tow vehicle.

Trailer 100 includes tank 120 (FIG. 1 and FIG. 2). Tank 120 includes a set of generally vertical sides 124. Cooperation of sides 124 defines an interior space (not shown) suitable for storage of fluid. Sides 124 include an elongated first major side wall 128 extending in the longitudinal direction. Sides 124 include an elongated second major side wall 129. Second major side wall 129 is spaced from first major side wall 128 in parallel, opposed relation therewith. Sides 124 include a rear wall 132 extending in a transverse direction between first major side wall 128 and second major side wall 129 and in perpendicular relationship thereto. Sides 124 include a front wall 136 spaced from rear wall 132 and in parallel, opposed relation thereto. Sides 124 are formed of suitable plate material 140. Those skilled in the art will appreciate that plate material 140 can be formed of any suitable material. In the embodiment illustrated in FIG. 1, plate material 140 is suitable steel plate material 144. As will be appreciated by those skilled in the art, in the specific embodiment illustrated in FIG. 1, plate material 140 is corrugated material having a nominal thickness of 0.25 inches. Side walls 128 are joined in a suitable manner, such as by weld seams (not shown). Cooperation of side walls 128 defines a generally continuous upper edge 148. Upper edge 148 extends generally in a horizontal direction around a perimeter 149 of tank 120. As shown in FIG. 2, tank 120 includes a generally horizontal roof 152. Roof 152 is joined to side walls 128 in a suitable manner. In the embodiment illustrated in FIG. 1, roof 152 is joined to side walls 128 at upper edge 148 by suitable weld seams (not shown). Roof 152 is formed of suitable plate material 156. Those skilled in the art will appreciate that plate material 156 can be formed of any suitable material. In the embodiment illustrated in FIG. 1, plate material 156 is suitable steel plate material. As will be appreciated by those skilled in the art, in the specific embodiment illustrated in FIG. 1, plate material 160 is flat steel plate having a nominal thickness of 0.25 inches. It will be appreciated that tank 120 includes a plurality of roof braces (not shown) supporting plate material 156 in a suitable manner. Tank 120 includes a tank bottom 164 (FIG. 1) spaced from roof 152 and generally in parallel relation therewith. Tank bottom 164 is joined in a suitable manner to side walls 128 and thus defines a bottom of the interior space (not shown). Skids 116 of base 104 are joined to tank bottom 164 to support tank 120 relative to the ground.

Roof 152 has therein a plurality of access portals 164 (FIG. 2). Each access portal 164 defines an opening in communication with interior space of tank 12. Roof 152 includes a plurality of movable access lids 176. Each access lid 176 is selectively movable relative to a respective access portal 164 between a closed position and an open position. Although access lids 176 can be supported for movement relative to access portals 164 in any suitable manner, in the specific embodiment illustrated and described herein, a horizontal hinge (not shown) enables each access lid 176 to be pivoted between the closed position and the open position. Each access lid 176 in the closed position prevents access to the interior space of tank 12 through the respective access portal 164. Each access lid 176 in the open position permits access to the interior space of tank 12 through the respective access portal 164. In the specific embodiment illustrated in FIG. 1, a front one 180 of the access portals 164 and a respective front one 184 of the access lids 176 are located in roof 152 adjacent upper edge 148 at vertical centerline 188 of front wall 136. It will be appreciated by those skilled in the art that fluid present in the interior space of tank 12 is visible along a line of sight extending through an access portal 164 when the respective access door 176 is in the open position. It will be appreciated by those skilled in the art that, according to embodiments (not shown) the front one 180 of the access portals 164 and the respective front one 184 of the access lids 176 located in roof 152 adjacent upper edge 148 of front wall 136 is not located at the centerline 188. More particularly, according to embodiments (not shown), the front one 180 of the access portals 164 and access lids 176 is spaced from vertical centerline 188 and one of the first major side wall 128 and the second major side wall 129. It will be appreciated by those skilled in the art that fluid present in the interior space of tank 12 is visible by an operator positioned to view along a line of sight extending through an access portal 164 from above the height of upper edge 148 of side walls 128 when the respective access door 176 is in the open position.

Trailer 100 includes forward frame 200. Forward frame 200 extends in the forward direction from tank 120 at front wall 136. Forward frame 200 includes a plurality of forward frame members 204. It will be appreciated by those skilled in the art that forward frame members 204 can be arranged in any suitable configuration. One skilled in the art will appreciate that the forward frame members 204 can be formed of any suitable rigid material having any suitable dimensions and cross-sectional profile. One skilled in the art will appreciate that cooperation of forward frame members 204 defines a tow bar assembly 205. In the specific embodiment illustrated in FIG. 1, forward frame members 204 include a spaced pair of major forward frame members 208. Each of the major forward frame members 208 is an elongated structural member. The pair of major forward frame members 208 extends in the longitudinal direction. More particularly, the major forward frame members 208 extend generally in the longitudinal direction from tank 120 at tank bottom 164 and base 104 at skids 116. The pair of major forward frame members 208 extends in spaced, parallel relation about 54 inches forward of front wall 136. In the specific embodiment illustrated in FIG. 1, each of the major forward frame members 208 is a tubular member of rectangular cross section formed of carbon steel, having a nominal size of 4 inches by 6 inches and ⅜ inches nominal wall thickness. Forward frame members 204 include terminal forward frame member 212. The pair of major forward frame members 208 intersects terminal forward frame member 212. One skilled in the art will appreciate that, in the specific embodiment illustrated in FIG. 1, forward frame member 212 defines a heavy duty nose bar 213 extending in the transverse direction. Terminal forward frame member 212 is joined to the pair of major forward frame members 208 in a suitable manner, such as by weld seams. Terminal forward frame member 212 extends in the transverse direction perpendicular to the parallel pair of major forward frame members 208. Terminal forward frame member 212 thus extends generally in spaced, parallel relation to front wall 136. In the specific embodiment illustrated in FIG. 1, terminal forward frame member 212 is a tubular member formed of carbon steel, having a nominal diameter of about 4.5 inches. The forward frame members 204 include a plurality of minor forward frame members (not shown) each traversing between the pair of major forward frame members 208. Each of the minor forward frame members extends in the transverse or perpendicular direction between the pair of major forward frame members 208 in spaced parallel relation to terminal forward frame member 212. Each of the minor forward frame members is an elongated rigid structural member having opposite ends each joined to and terminating at one of the major forward frame members 208 in a suitable manner. In the specific embodiment illustrated, the opposite ends of minor forward frame members are joined to the major forward frame members 208 by weld seams. Forward frame members 204 include a forward pan member 220. Forward pan member 220 is formed of continuous plate material 223. Forward pan member 220 extends between terminal forward frame member 208 and a minor forward frame member. Forward pan member 220 is joined to terminal forward frame member 212 and the minor forward frame member in a suitable manner, such as by weld seams. A king pin 224 is mounted on forward frame 204 in a suitable manner and location. King pin 224 is adapted to be received by a tow vehicle for towing trailer 100. The forward frame members 204 include a spaced pair of generally opposed first and second forward outer frame members 225,226. The first and second forward outer frame member 225,226 are elongated members extending generally in the longitudinal direction and generally parallel to respective of the major forward frame members 208. A major portion 227 of each of the first and second forward outer frame members 225,226 is spaced in the transverse direction and outward from a respective one of the major forward frame members 208. The major portion 227 of each of the first and second forward outer frame members 225,226 extends in the longitudinal direction along a respective first major outer frame axis 229 or second major outer frame axis 231 (FIG. 2). It will be understood that the first major outer frame axis 229 and second major outer frame axis 231 are each aligned generally beneath a respective one of the first major side wall 128 and second major side wall 129, and generally in a common vertical plane therewith. A minor portion 228 of each of the first and second forward outer frame members 225,226 curves inwardly in the transverse direction from major portion 227 and intersects a respective one of the major forward frame members 208.

Trailer 100 includes manifold assembly 300. Manifold assembly 300 is supported by forward frame 200. Manifold assembly 300 includes manifold pipe 304 entering tank 120 at a flange 305. The flange defines a passage through front wall 136. Manifold assembly 300 includes manifold header 308. Manifold header 308 is joined to manifold pipe 304 by a suitable fitting (not shown). In the specific embodiment illustrated in FIG. 1, fitting 312 is a tee fitting. Manifold header 308 includes a set of ports 316. In the specific embodiment illustrated in FIG. 1, manifold header 308 includes four front hose ports 320 and two end ports 324. More particularly, in the specific embodiment illustrated in FIG. 1, manifold header 308 includes an elongated tubular body 328 having spaced ends 332. Tubular body 328 has therein the four front hose ports 320 spaced therealong. Each hose port 320 is adapted to be connected to a respective fluid hose (not shown). Tubular body 328 includes a pair of ends each having therein a respective one of the end ports 324. Each end port 324 is adapted to be connected to a respective fluid hose (not shown). Forward frame 200 includes a plurality of manifold supports 340 (FIG. 1) supporting manifold assembly 300 in a fixed position. In the specific embodiment illustrated in FIG. 1, manifold assembly 300 extends about 36 inches from front wall 136 and is supported at a height of about 18 inches above the forward frame members 204. It will be understood by those skilled in the art that hoses (not shown) can be routed across the ground from a drill rig and connected to each front hose port 320 and end port 324 during use of tank 120 for storing and dispensing fluid.

Trailer 100 includes forward platform 400. Forward platform 400 is supported in a fixed position adjacent front wall 136 of tank 120 and generally above forward frame 200 and manifold assembly 300. Forward platform 400 is located relative to upper edge 148 at a height suitable for an operator standing on forward platform 400 to view roof 152 from an elevated line of sight. In the specific embodiment illustrated, forward platform 400 is also located relative to upper edge 148 at a height suitable for an operator standing on forward platform 400 to manually reach and move at least the front one 184 of the access lids 176 relative to the front one 180 of the access portals 164 adjacent front wall 136 on roof 152 to enable the operator when standing on forward platform 400 to view along an elevated line of sight liquid into the interior space of tank 120 through front one 180. It will be understood that forward platform 400 can be constructed and supported in any suitable manner. It will also be understood that forward platform 400 can be of any desired shape and size. In the specific embodiment illustrated in FIG. 1, forward platform 400 defines a generally rectangular platform floor 404. Platform floor 404 includes inner edge 428 (FIG. 4) adjacent front wall 136. Platform floor 404 includes outer edge 432 extending in spaced parallel relation to inner edge 428 and front wall 136. Platform floor 404 includes spaced first and second edges 436,440 (FIG. 5) extending between inner edge 428 and outer edge 432 in perpendicular relation thereto. It will be appreciated by those skilled in the art that platform floor 404 can be formed of any suitable material. In the specific embodiment illustrated, platform floor 404 is formed of suitable tread plate or floor grate 408. Floor grate 408 can be formed of any suitable material and, in the embodiment illustrated in FIG. 1, is formed of suitable metal which is galvanized steel. In the specific embodiment illustrated in FIG. 1, floor grate 408 is formed of open lattice perforated galvanized steel 412 having skid resistant upper surface serrations (not shown). It will be understood that platform floor 404 can be formed of any suitable material. In the specific embodiment illustrated in FIG. 1, forward platform 400 includes a plurality of platform frame members 416 adapted to support platform floor 404 in an elevated position. It will be understood that platform frame members 416 can be configured in any suitable manner. In embodiments (not shown), forward platform 400 does not include platform frame members 416. In embodiments (not shown), forward platform 400 includes platform frame members 416 integrally formed with platform floor 404. In the specific embodiment illustrated in FIG. 1, platform frame members 416 include a spaced pair of inner and outer platform frame members 420,424. Inner platform frame member 420 and outer platform frame member 424 extend in spaced parallel relation and support respective inner and outer edge portions of floor grate 408. In the specific embodiment illustrated in FIG. 1, the inner platform frame member 420 and outer platform frame member 424 are located beneath respective of the inner and outer edges of floor grate 408. In the embodiment illustrated in FIG. 1, the inner platform frame member 420 and outer platform frame member 424 each include respective opposite first and second ends. More particularly, in the specific embodiment illustrated in FIG. 1, the inner platform frame member 420 and outer platform frame member 424 are formed of respective beams 452. One will appreciate that beams 452 can be formed of any suitable material having any suitable cross sectional profile. In the specific embodiment illustrated in FIG. 1, beams 452 are formed of carbon steel I-beam. In the specific embodiment illustrated in FIG. 1, the first and second ends of beams 452 are each angled to join other members in abutting relationship as further described herein. One of skill in the art will appreciate that beams 452 can be arranged differently. One skilled in the art will understand that platform frame members 416 can be joined in any suitable manner such as, for example, by weld seams (not shown) or by a plurality of threaded bolt and nut fasteners (not shown). One skilled in the art will appreciate that, in the specific embodiment illustrated in FIG. 1, inner platform frame member 420 and outer platform frame member 424 are supported by a first forward access ladder 500 and a second forward access ladder 600 as elsewhere described herein. One skilled in the art will appreciate that in other embodiments (not shown), inner platform frame member 420 is supported by tank wall 136 and is joined thereto in a suitable manner such as, for example, weld seams. It will be appreciated that forward platform 400 has a width of about twenty four inches from the inner platform frame member 420 and outer platform frame member 424. It will be further understood that first forward access ladder 500 and second forward access ladder 600 further described herein each have a width of about 24 inches.

Trailer 100 includes first forward access ladder 500. First forward access ladder 500 extends from forward platform 400 to first side 103. First forward access ladder 500 is configured to permit an operator from the ground adjacent first side 103 to mount on foot the first forward access ladder 500, thereafter to ascend on foot first forward access ladder 500, and thereafter from first forward access ladder 500 to mount on foot forward platform 400. More particularly, in the specific embodiment illustrated, first forward access ladder 500 extends downward from first edge 436 of forward platform 400 to first forward outer frame member 225 on first side 103. It will be understood that first forward access ladder 500 can be of any suitable construction. For example, according to embodiments (not shown), first forward access ladder 500 can extend above forward platform 400 and can extend below first forward outer frame member 225. According to embodiments (not shown), first forward access ladder 500 can be configured and positioned to permit an operator to mount forward platform 400 at a location other than first edge 436 thereof. Also, according to embodiments (not shown), first forward access ladder 500 can be configured and positioned to permit an operator from the ground adjacent first side 103 to mount on foot the first forward outer frame member 225, thereafter from first forward outer frame member 225 to mount on foot the first forward access ladder 500, thereafter to ascend on foot first forward access ladder 500, and thereafter from first forward access ladder 500 to mount on foot forward platform 400. It will be understood that the terms "mount on foot" and "ascend on foot", as used herein, anticipate and include movements on foot by an operator with accompanying use and assistance of hands, limbs and other body parts, such as by the use of handrails 700 and grab irons (not shown).

First forward access ladder 500 can be of any suitable construction. In the specific embodiment illustrated in FIG. 1, first forward access ladder 500 includes an inclined section 504 extending downward from first edge 436 of forward platform 400 to an intermediate position 508. It will be appreciated that inclined section 504 defines a sloped stairway 512. In the embodiment illustrated in FIG. 1, intermediate position 508 is located in the vertical direction above first forward outer frame member 225. In the specific embodiment illustrated in FIG. 1, first forward access ladder 500 includes a vertical section 506 extending in the vertical direction downward from inclined section 504 at intermediate position 508 to first forward outer frame member 225 on first side 103. It will be understood by those skilled in the art that intermediate position 508 can be located in any suitable position generally between forward platform 400 and first side 103. In the specific embodiment illustrated, first forward access ladder 500 thus includes inclined section 504 and adjoining vertical section 506. In the embodiment specifically illustrated in FIG. 1, first forward access ladder 500 includes a pair of elongated first and second stringers 516,520 extending in parallel spaced relation. The first and second stringers 516,520 are mirror images of each other. Each of the first and second stringers 516,520 includes an inclined stringer section 524 adjoined by a vertical stringer section 528. Inclined stringer section 524 is an elongated member 530 having spaced upper and lower ends. Vertical stringer section 528 is an elongated member 534 having spaced upper and lower ends. It will be understood that elongated members 530,534 can be formed of any suitable material. In the specific embodiment illustrated in FIG. 1, elongated members 530,534 are formed of respective carbon steel I-beams 546. It will be appreciated that upper end of inclined stringer section 524 terminates at an angle suitable to be joined to forward platform 400. It will be understood that upper end of inclined stringer section 524 is joined to forward platform 400 in a suitable manner. In the specific embodiment illustrated in FIG. 1, the upper end of inclined stringer section 524 is joined to forward platform 400 at a welded joint by suitable weld seams (not shown). In the specific embodiment illustrated in FIG. 1, inclined stringer section 524 has a lower end 536 which terminates at an angle suitable to be joined to an upper end of vertical stringer section 528. It will be understood that the lower end of inclined stringer section 524 is joined to upper end of vertical stringer section 528 in a suitable manner. In the specific embodiment illustrated in FIG. 1, the lower end of inclined stringer section 524 is joined to the upper end of vertical stringer section 528 at a joint by suitable weld seams (not shown). It will be appreciated that, in the specific embodiment illustrated in FIG. 1, the lower end of vertical stringer section 528 is joined to first forward outer frame member 225 in a suitable manner. In the embodiment illustrated in FIG. 1, the lower end of vertical stringer section 528 is joined to first forward outer frame member 225 by a suitable threaded fastener and bracket combination (not shown). It will be appreciated that in other specific embodiments (not shown), the lower end of vertical stringer section 528 is not joined to first forward outer frame member 225. It will be appreciated that first forward access ladder 500 includes a set of spaced steps 558. Each step 558 extends between first and second stringers 516,520. Each step 558 defines a respective tread 562 suitable to receive the feet of an operator for ascending and descending. It will be understood that steps 558 are supported in any suitable manner. In the specific embodiment illustrated in FIG. 1, steps 558 are joined to first and second stringers 516,520 in a suitable manner, such as by weld seams (not shown). Steps 558 are formed of any suitable material. In the embodiment illustrated in FIG. 1, steps 558 are formed of suitable metal which is galvanized steel. In the specific embodiment illustrated in FIG. 1, steps 558 are formed of open lattice perforated galvanized steel 566 having skid resistant upper surface serrations (not shown) defining treads 562.

Trailer 100 includes second forward access ladder 600. Second forward access ladder 600 is a mirror image of first forward access ladder 500, except as otherwise described herein or as otherwise described in the accompanying figures which are incorporated in this specification. Second forward access ladder 500 extends from forward platform 400 to second side 105. Second forward access ladder 600 is configured to permit an operator from the ground adjacent second side 105 to mount on foot the second forward access ladder 600, thereafter to ascend on foot up second forward access ladder 600, and thereafter from second forward access ladder 600 to mount on foot forward platform 400. More particularly, in the specific embodiment illustrated, second forward access ladder 600 extends downward from second edge 440 of forward platform 400 to second forward outer frame member 226 on second side 105.

It will be understood by those skilled in the art that, in the specific embodiment illustrated in FIG. 1, forward platform 400, first forward access ladder 500 and second forward access ladder 600 define an integral forward platform and dual ladder assembly 680. It will be understood by those skilled in the art that, in other specific embodiments (not shown), forward platform 400, first forward access ladder 500 and second forward access ladder 600 are independent of each other and may not abut or be joined together. It will be understood by those skilled in the art that, in other specific embodiments (not shown), first forward access ladder 500 and second forward access ladder 600 are not mirror images of each other. For example, in other specific embodiments (not shown), forward platform 400 is closer to one of the first side and the second side, and first forward access ladder 500 and second forward access ladder 600 are configured differently to provide operator access between the forward platform and the ground on the first side and between the forward platform and the ground on the second side. In other specific embodiments (not shown), the first forward access ladder 500 and second forward access ladder 600 can share one or more common steps or components. In other embodiments (not shown), either or both of the first forward access ladder 500 and the second forward access ladder 600 may be interrupted by other structure of trailer 100, such as by forward frame 200 or tank 120.

Trailer 100 includes handrails 700. It will be understood that handrails 700 can be of any suitable configuration. Handrails 700 are positioned to be grasped by an operator located on forward platform 400, first forward access ladder 500, and second forward access ladder 600. It will be appreciated that handrails 700 are positioned to prevent an operator from falling off or down from forward platform 400, first forward access ladder 500, and second forward access ladder 600. It will be appreciated that handrails 700 are positioned to assist an operator moving on forward platform 400, first forward access ladder 500, and second forward access ladder 600. In the specific embodiment illustrated in FIG. 1, handrails 700 are fixed to and supported in fixed relation by forward platform 400, first forward access ladder 500, and second forward access ladder 600. More particularly, handrails 700 are supported in a fixed position adjacent and extending above respective outer edges of forward platform 400, first forward access ladder 500, and second forward access ladder 600. In the specific embodiment illustrated in FIG. 1, handrails 700 are joined together. It will be appreciated that grab irons are supported by front wall 136 of tank 120. Grab irons 720 are located generally in opposition to handrails 700 above first forward access ladder 500 and second forward access ladder 600. The grab irons thus are positioned to be grasped by an operator ascending or descending first forward access ladder 500 and second forward access ladder 600.

Trailer 100 includes forward manhole 800. Forward manhole 800 is located in front wall 136 immediately below forward platform 400. Valves 820 are located on front wall 136.

According to embodiments, trailer 100 includes forward platform 400, first forward access ladder 500, and second forward access ladder 600 which cooperate and enable an operator to move across trailer 100 from the ground on the first side 103 to the ground on the second side 105, and in the reverse direction. An operator enabled to move across trailer 100 from the ground on the first side 103 to the ground on the second side 105 by moving across forward platform 400, first forward access ladder 500, and second forward access ladder 600 can avoid stepping around the forward frame 200 in front of the heavy duty nose bar 213 and can avoid stepping over numerous fluid hoses connected to manifold header 308 and routed to a drilling rig. According to embodiments, an operator is enabled to move directly across trailer 100 from the ground on the first side 103 to the ground on the second side 105 by moving across forward platform 400, first forward access ladder 500, and second forward access ladder 600 along a relatively short, straight, unobstructed path. According to embodiments where numerous trailers 100 are aligned side by side in a row, an operator on foot can walk between and visit forward platforms 400 of each trailer 100 along a relatively short, straight, unobstructed path, and without stepping around the forward frames 200 and heavy duty nose bars 213 and without stepping over numerous fluid hoses connected to manifold header 308 and routed to the drill rig. It will be appreciated that embodiments provide an improved method for providing industrial fluids by hose to a recipient, such as a drill rig, the method 990 including arrangement of multiple trailers 100 as described in this paragraph and routing an operator through the multiple trailers 100 by directing the operator on foot to move directly across trailer 100 from the ground on the first side 103 to the ground on the second side 105 by moving across forward platform 400, first forward access ladder 500, and second forward access ladder 600 along a relatively short, straight, unobstructed path, and to repeat this route for each trailer 100.

Figure 7:
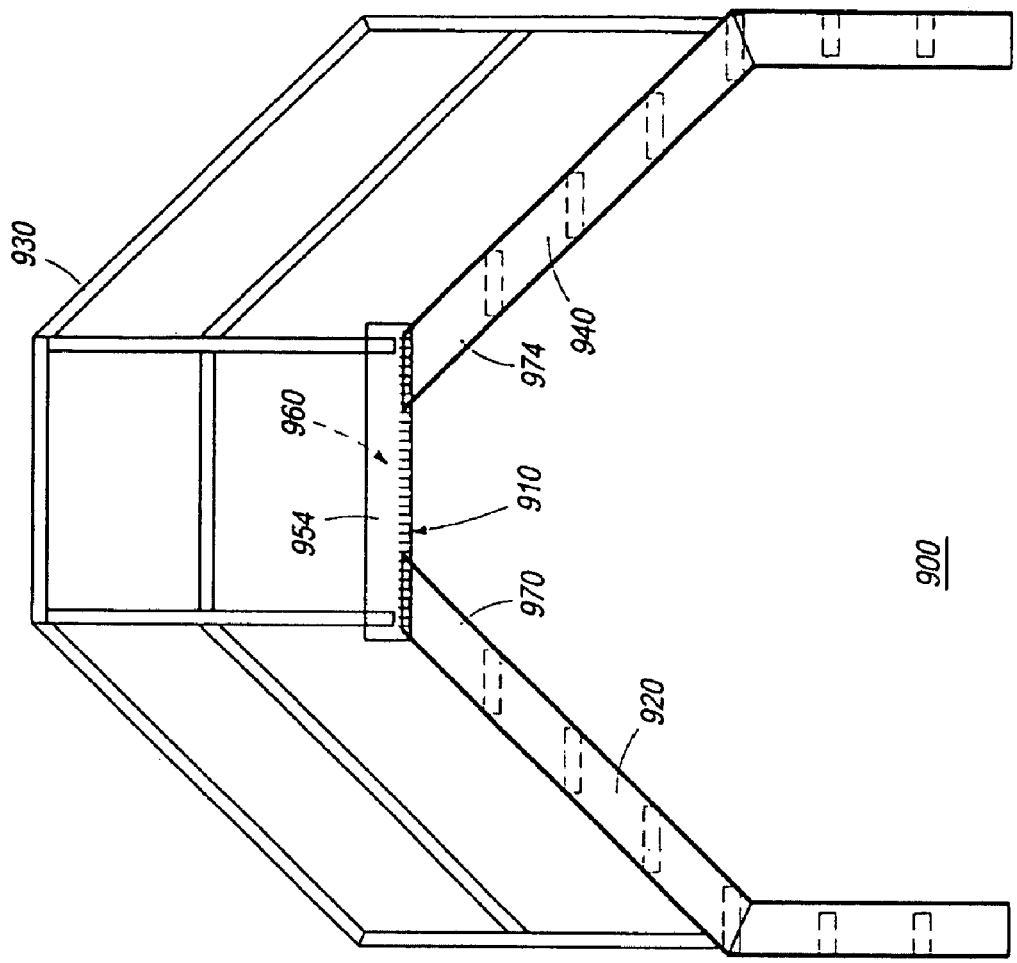
FIG. 7 is an enlarged partial isolation taken generally along 7-7 in FIG. 6.
Figure 6:
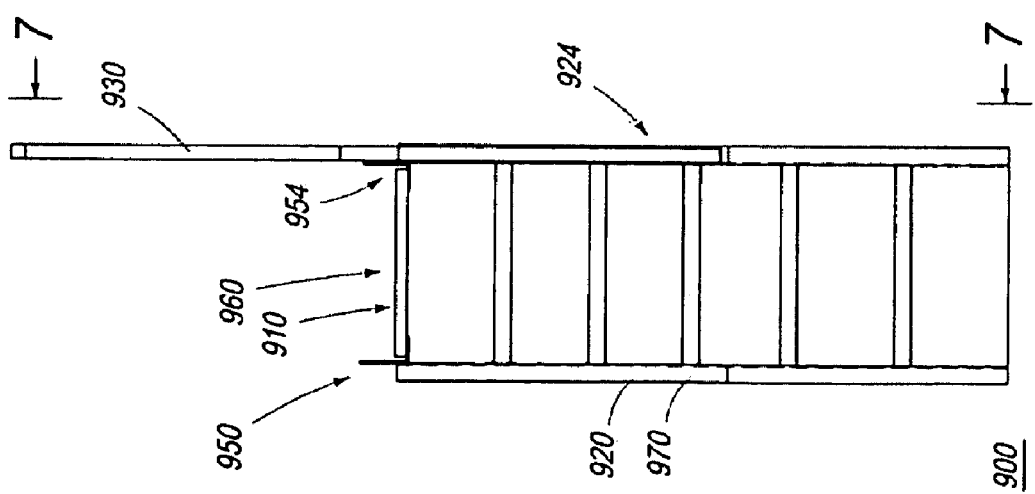
FIG. 6 is an enlarged partial side isolation view identical to FIG. 4, showing a forward platform 910, first forward access ladder 920 and handrails 930 of a fluid storage tank trailer 900 according to an alternate embodiment.

FIG. 6 is an enlarged partial side isolation view identical to FIG. 4, showing a forward platform 910, first forward access ladder 920 and handrails 930 of a fluid storage tank trailer 900 according to an alternate embodiment. FIG. 7 is an enlarged partial isolation taken generally along 7-7 in FIG. 6. It will be appreciated that trailer 900 is identical to trailer 100, except as otherwise described herein and by the drawings. Platform 910 includes a pair of inner and outer ninety degree channels 950,954 supporting floor grate 960. Inner and outer ninety degree channels 950,954 are supported by cooperation of first and second stringers 970,974.

One of skill in the art will appreciate that embodiments provide improved fluid storage tank trailers. One of skill in the art will appreciate that embodiments provide improved fluid storage tank trailers adapted for storage of fluids at drilling sites for oil and gas wells. Although specific embodiments are illustrated and described herein, it will be appreciated by those of ordinary skill in the art that any arrangement which is calculated to achieve the same purpose can be substituted for the specific embodiments shown. This specification is intended to cover any adaptations or variations of embodiments. For example, although described in terms of the specific embodiments, one of ordinary skill in the art will appreciate that implementations can be made in different embodiments to provide the required function. In particular, one of skill in the art will appreciate that the names and terminology are not intended to limit embodiments. Furthermore, additional apparatus can be added to the components, functions can be rearranged among components, and new components corresponding to future enhancements and future physical devices used in embodiments can be introduced without departing from the scope of embodiments. The terminology used in this application is intended to include all environments and alternatives which provide the same functionality as described herein.

I claim:

1. A fluid storage tank trailer, the trailer having an elongated first side, a second side spaced from the first side in parallel relation therewith, a rear end extending between the first side and the second side, and a front end spaced from the rear end in a forward direction, the trailer comprising:
   a base, the base including a set of rear wheels mounted to engage the ground for rolling movement relative thereto;
   a tank supported by the base, the tank having a first side wall extending generally along the first side, the tank having a second side wall extending generally along the second side, the tank having a rear wall extending between the first side wall and the second side wall, the tank having a front wall spaced from the rear wall, the tank having a tank bottom, the tank having an internal space suitable to contain fluid material;
   the base including a set of skids beneath the tank, the skids being adapted to engage the ground forward of the rear wheels when the trailer is not connected to a tow vehicle, the skids being adapted to support the tank bottom in relation to the ground;
   a forward frame extending from generally beneath the tank to the front end, the forward frame including a nose bar at the front end, the forward frame being adapted to be towed by a tow vehicle;
   a forward platform adjacent the front wall, the forward platform being elevated above the forward frame;

a first forward access ladder extending from the forward platform to the first side;
a second forward access ladder extending from the forward platform to the second side; and
a manifold in communication with the tank, the manifold being supported by the forward frame at a manifold height, the manifold height being lower than a height of the forward platform.

2. A fluid storage tank trailer as set forth in claim 1 and further comprising:
the forward frame including a first forward outer frame member extending generally along the first side,
the first forward access ladder extending generally from the forward platform to the first forward outer frame member,
the forward frame including a second forward outer frame member extending generally along the second side,
the second forward access ladder extending generally from the forward platform to the second forward outer frame member.

3. A fluid storage tank trailer as set forth in claim 1 and further comprising:
the first forward access ladder including an inclined section and a vertical section, the inclined section extending from a first edge of the forward platform to an intermediate point, the vertical section extending from the intermediate point down toward the first outer forward frame member,
the second forward access ladder including an inclined section and a vertical section, the inclined section extending from a second edge of the forward platform to an intermediate point, the vertical section extending from the intermediate point down toward the second outer forward frame member.

4. A fluid storage tank trailer as set forth in claim 1 and further comprising:
the manifold including a manifold header located between the first forward access ladder, the second forward access ladder, and the nose bar.

5. A fluid storage tank trailer as set forth in claim 1 and further comprising:
the manifold header, forward platform, the first forward access ladder, and the second forward access ladder being located between the front wall and nose bar.

6. A fluid storage tank trailer as set forth in claim 1 and further comprising:
the forward platform being located adjacent a vertical centerline of the front wall of the tank.

7. A fluid storage tank trailer, the trailer having an elongated first side, a second side spaced from the first side in parallel relation therewith, a rear end extending between the first side and the second side, and a front end spaced from the rear end in a forward direction, the trailer comprising:
a base, the base including a set of rear wheels mounted to engage the ground for rolling movement relative thereto;
a tank supported by the base, the tank having a first side wall extending generally along the first side, the tank having a second side wall extending generally along the second side, the tank having a rear wall extending between the first side wall and the second side wall, the tank having a front wall spaced from the rear wall, the tank having a tank bottom, the tank having an internal space suitable to contain fluid material;
the base including a set of skids beneath the tank, the skids being adapted to engage the ground forward of the rear wheels when the trailer is not connected to a tow vehicle, the skids being adapted to support the tank bottom in relation to the ground;
a forward frame extending from generally beneath the tank to the front end, the forward frame including a nose bar at the front end, the forward frame being adapted to be towed by a tow vehicle;
a forward platform adjacent the front wall, the forward platform being elevated above the forward frame;
a first forward access ladder extending from the forward platform to the first side; and
a second forward access ladder extending from the forward platform to the second side;
wherein cooperation of the forward platform, the first forward access ladder, and the second forward access ladder enable an operator to move across the trailer from the ground on the first side to the ground on the second side; and
a manifold in communication with the tank, the manifold being supported by the forward frame at a manifold height, the manifold height being lower than a height of the forward platform.

8. A fluid storage tank trailer as set forth in claim 7 and further comprising:
the forward frame including a first forward outer frame member extending generally along the first side,
the first forward access ladder extending generally from the forward platform to the first forward outer frame member,
the forward frame including a second forward outer frame member extending generally along the second side,
the second forward access ladder extending generally from the forward platform to the second forward outer frame member.

9. A fluid storage tank trailer as set forth in claim 7 and further comprising:
the first forward access ladder including an inclined section and a vertical section, the inclined section extending from a first edge of the forward platform to an intermediate point, the vertical section extending from the intermediate point down toward the first outer forward frame member,
the second forward access ladder including an inclined section and a vertical section, the inclined section extending from a second edge of the forward platform to an intermediate point, the vertical section extending from the intermediate point down toward the second outer forward frame member.

10. A fluid storage tank trailer as set forth in claim 7 and further comprising:
the manifold including a manifold header located between the first forward access ladder, the second forward access ladder, and the nose bar.

11. A fluid storage tank trailer as set forth in claim 7 and further comprising:
the manifold header, forward platform, the first forward access ladder, and the second forward access ladder being located between the front wall and nose bar.

12. A fluid storage tank trailer as set forth in claim 7 and further comprising:
the forward platform being located adjacent a vertical centerline of the front wall of the tank.

* * * * *